US009155240B2

(12) United States Patent  
Redekop

(10) Patent No.: US 9,155,240 B2
(45) Date of Patent: Oct. 13, 2015

(54) TILLAGE IMPLEMENT

(76) Inventor: Johan Redekop, Winkler (CA)

(*) Notice: Subject to any disclaimer, the term of this patent is extended or adjusted under 35 U.S.C. 154(b) by 399 days.

(21) Appl. No.: 13/351,032

(22) Filed: Jan. 16, 2012

(65) Prior Publication Data

US 2012/0312569 A1  Dec. 13, 2012

Related U.S. Application Data

(60) Provisional application No. 61/496,130, filed on Jun. 13, 2011.

(51) Int. Cl.
A01B 61/04 (2006.01)
A01B 73/04 (2006.01)

(52) U.S. Cl.
CPC .................... A01B 73/044 (2013.01)

(58) Field of Classification Search
CPC ..... A01B 61/046; A01B 35/28; A01B 73/046
USPC .......................... 172/311, 705, 706
See application file for complete search history.

(56) References Cited

U.S. PATENT DOCUMENTS

| 2,211,675 | A | * | 8/1940 | Rushbrook | 172/572 |
| 3,061,018 | A | * | 10/1962 | Olson | 172/139 |
| 3,981,367 | A | * | 9/1976 | Mydels | 172/265 |
| 4,203,494 | A | * | 5/1980 | Hansen | 172/166 |
| 4,261,423 | A | * | 4/1981 | Williamson | 172/705 |
| 4,407,372 | A | * | 10/1983 | Rozeboom | 172/572 |
| 4,461,358 | A | * | 7/1984 | Lewison | 172/705 |
| 4,520,878 | A | * | 6/1985 | Smith et al. | 172/705 |
| 5,279,236 | A | * | 1/1994 | Truax | 111/139 |
| 5,787,992 | A | * | 8/1998 | Dobson et al. | 172/264 |
| 6,102,132 | A | * | 8/2000 | Schimke | 172/498 |
| 6,158,523 | A | * | 12/2000 | Gengler et al. | 172/574 |
| 7,753,134 | B1 | | 7/2010 | Anderson et al. | |
| 8,113,295 | B2 | * | 2/2012 | Rozendaal et al. | 172/573 |
| 8,534,374 | B2 | * | 9/2013 | Hake et al. | 172/599 |
| 2011/0056712 | A1 | | 3/2011 | Rozendaal et al. | |

* cited by examiner

Primary Examiner — Thomas B Will
Assistant Examiner — Joel F. Mitchell
(74) Attorney, Agent, or Firm — Ryan W Dupuis; Kyle R. Satterthwaite; Ade & Company Inc.

(57) ABSTRACT

A tillage implement includes a main frame with adjustable toolbar sections thereon which each support respective tillage units thereon for engaging the ground. According to one aspect of the invention, the toolbar sections are angularly adjustable about a pivot head at one end thereof while also being slidable in a longitudinal direction of the toolbar section to maintain alignment of the tillage units. The pivot head is elongate in a direction transverse to the toolbar section to resist moments applied to the toolbar section by the tillage units engaging the ground while the toolbar section remains adjustable. In another aspect of the invention, the tillage units each comprise a trailing arm supporting the respective coulter disks thereon. The trailing arm is pivoted between two side plates fixed to the toolbar section and biased downward by a spring enclosed between the side plates to resist debris catching on the spring.

21 Claims, 14 Drawing Sheets

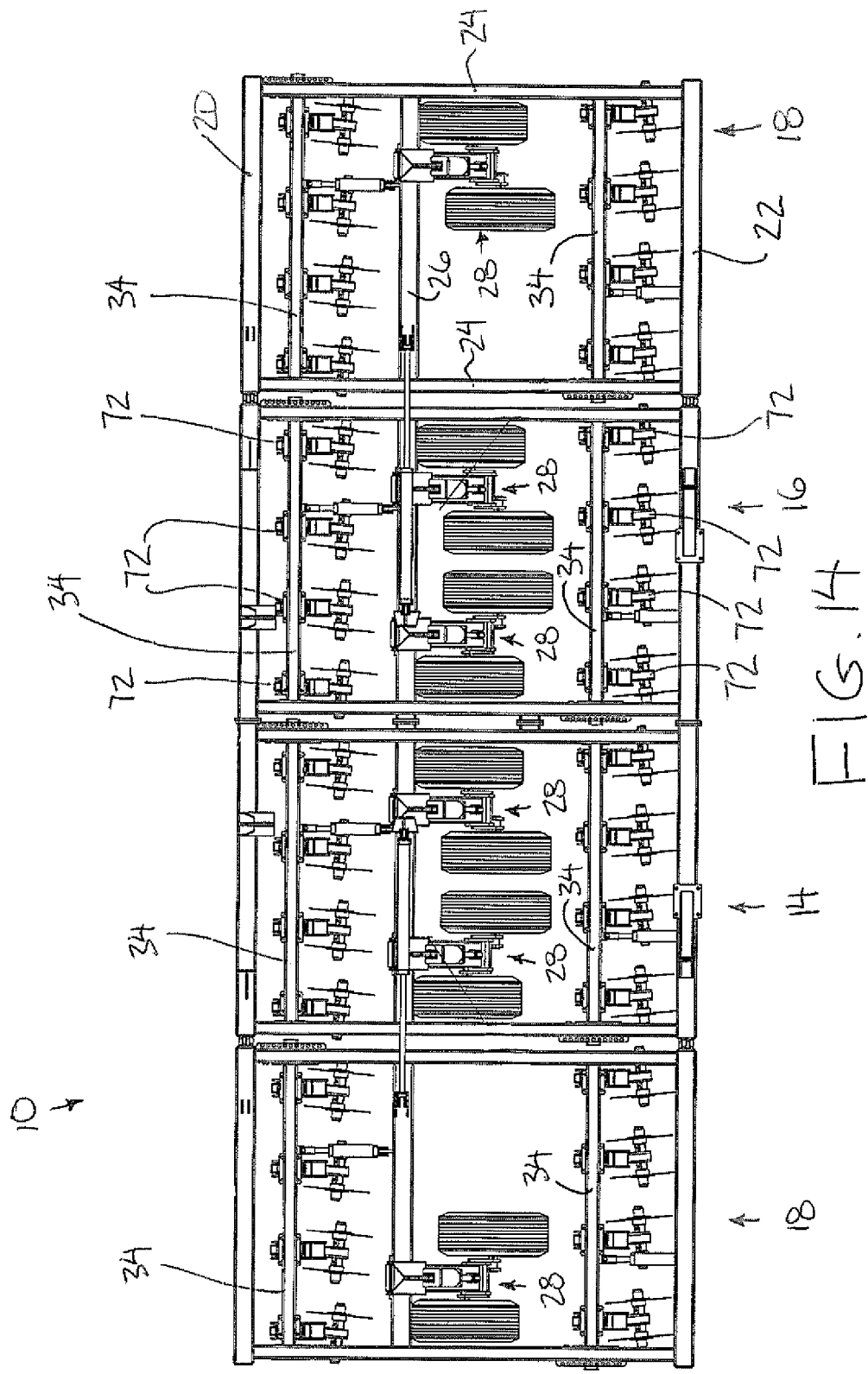

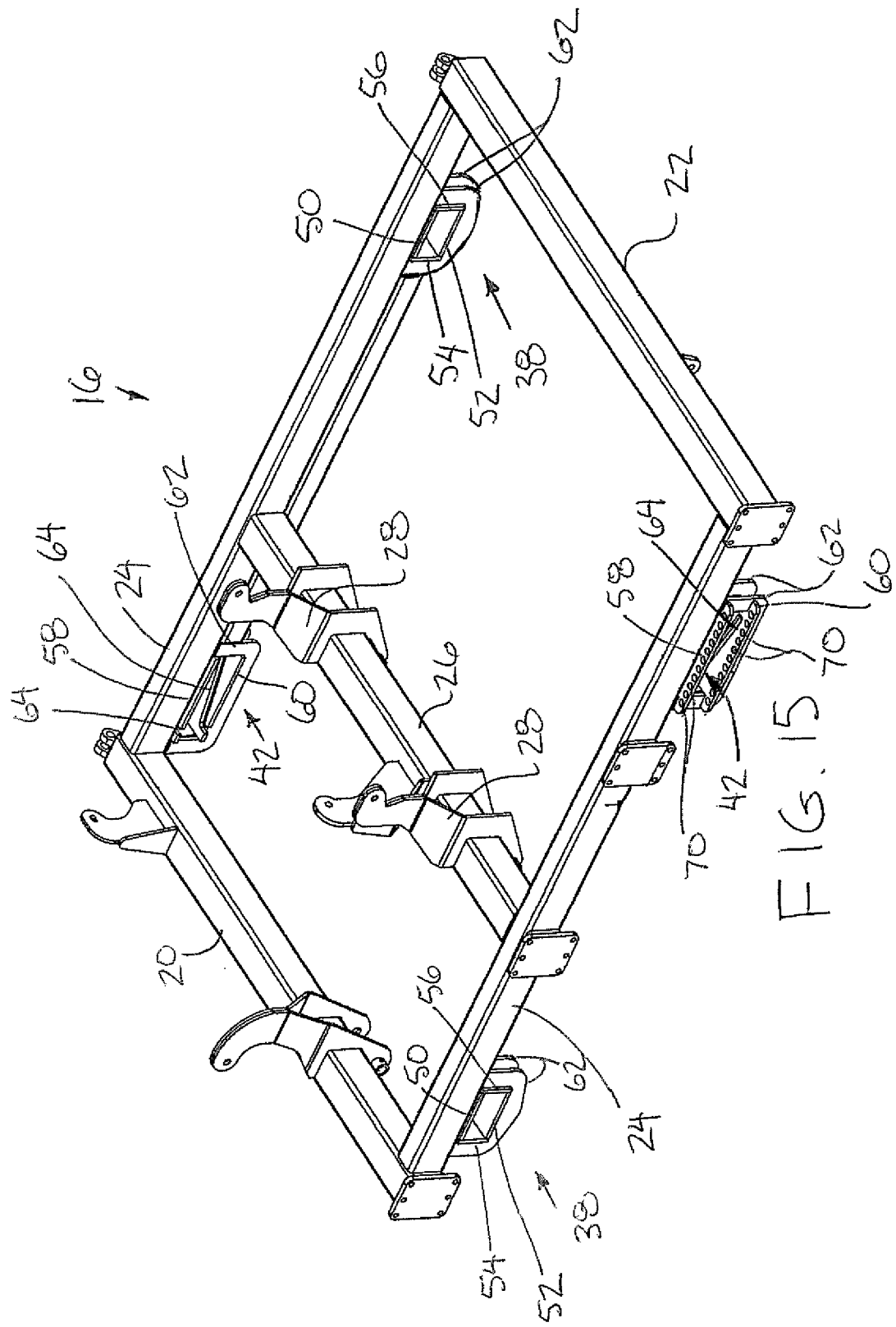

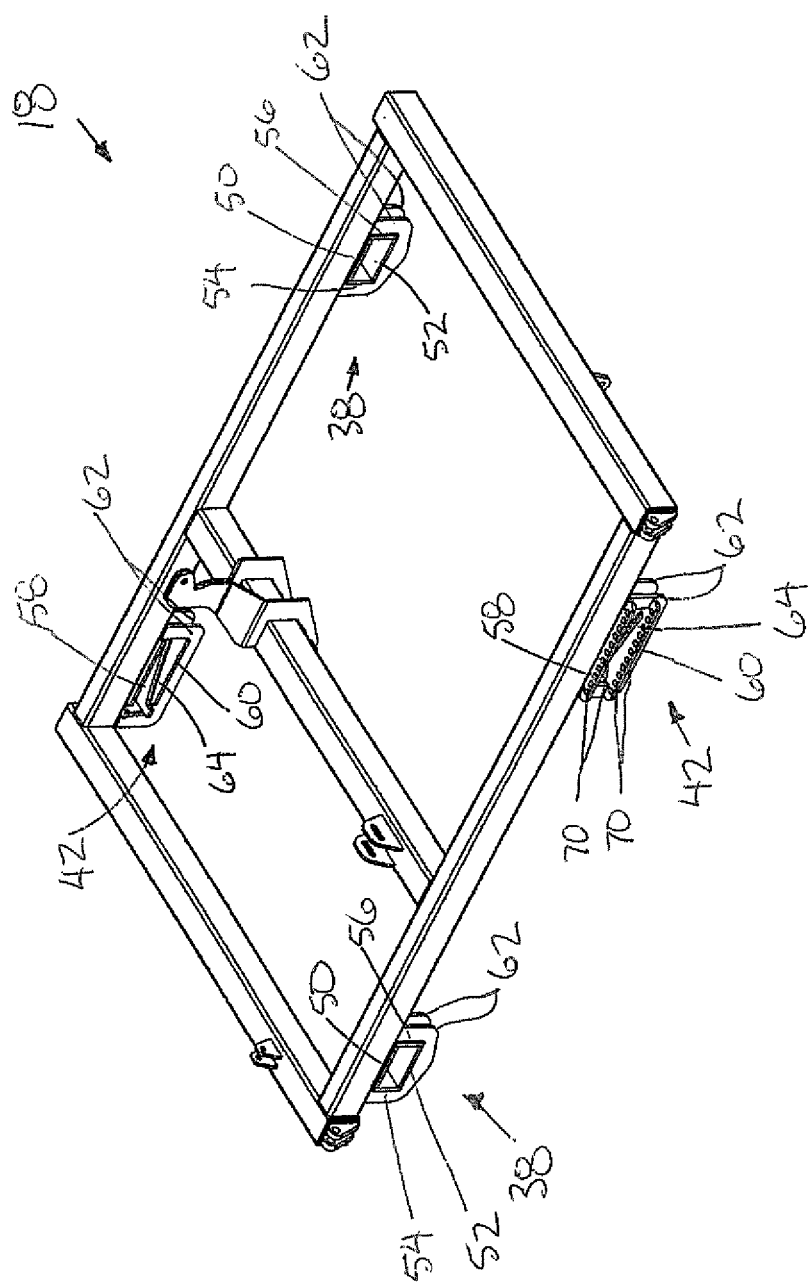

TILLAGE IMPLEMENT

This claims the benefit under 35 U.S.C. 119(e) of U.S. provisional application Ser. No. 61/496,130, filed Jun. 13, 2011.

FIELD OF THE INVENTION

The present invention relates to a tillage implement comprising a frame which supports a plurality of toolbar sections having coulter disk tillage units supported thereon such that the toolbar sections are adjustable relative to the frame, and more particularly the present invention relates to a tillage implement wherein the tillage units each comprise a pivotal trailing arm supporting the coulter disk thereon and being supported for deflection relative to the respective toolbar section.

BACKGROUND

As described in US Patent Application Publication No. US2011/0056712 by Rozendaal et al, in one known form of conservation tillage, the soil is minimally disturbed prior to planting in order to allow air to penetrate the mat of crop residue. This technique is variously known as minimum tillage, residue management, soil aeration or seedbed aeration. A farm implement, sometimes known as a vertical tillage implement, is used to cut the crop residue and penetrate a short distance into the surface of the soil while lifting the soil vertically to permit access of air to the soil.

Known constructions of coulter disk vertical tillage implement typically support the coulter disk by an exposed spring member to resiliently bias the coulter disk downwardly into engagement with the ground. The exposed configuration of the spring member however commonly results in considerable debris being trapped in the spring such as corn stalks and the like which is a nuisance and can affect performance of the implement. Another deficiency which known constructions of vertical tillage implements having adjustable toolbar sections is the limited downforce that can be applied to the coulter disks due to the difficulty in providing adequate support to the toolbar sections supporting the coulter disks thereon when the toolbar sections are adjustable in angular orientation. Yet another deficiency with known constructions of vertical tillage implements is the cumbersome manner of replacing the coulter disks if damaged.

SUMMARY OF THE INVENTION

According to one aspect of the invention there is provided a tillage implement comprising:

a main frame supported for movement across the ground in a forward working direction;

a hitch arranged for connection to a towing vehicle;

a plurality of toolbar sections supported on the main frame so as to be oriented transversely to the forward working direction;

each toolbar section extending in a respective longitudinal direction between a first end coupled to the main frame by a respective first mounting assembly and a second end coupled to the main frame by a respective second mounting assembly such that the toolbar section is angularly adjustable relative to the forward working direction; and a plurality of tillage units supported on the toolbar sections respectively, each tillage unit comprising:

a trailing arm extending generally rearwardly from a forward end supported on the respective toolbar section to an opposing trailing end such that the trailing end is movable upwardly from a normal working position to a deflected position;

a coulter disk supported on the trailing end of the trailing arm so as to be arranged for tilling the ground; and a biasing member arranged to bias the trailing arm downwardly towards the normal working position;

the first end of each toolbar section comprising a pivot member which is elongate generally in the forward working direction between opposing front and rear bearing surfaces so as to extend transversely to the longitudinal direction of the toolbar section;

each first mounting assembly comprising a socket arranged to receive the pivot member matingly therein, the socket including a front and rear bearing surfaces engaging respective ones of the front and rear bearing surfaces of the pivot member such that the pivot member is:

fixed relative to the frame in the forward working direction;
slidable relative to the frame in a lateral direction perpendicular to the forward working direction; and
pivotal relative to the frame about an upright axis;

each second mounting assembly comprising upper and lower bearing surfaces slidably receiving the toolbar section therebetween;

the second end of each toolbar section comprising a follower in mating engagement with a respective track formed on the bearing surfaces of the respective second mounting assembly;

the track of each second mounting assembly being arranged to guide movement of the respective toolbar section in the lateral direction as the second end of the toolbar section is displaced in the forward working direction by pivoting the toolbar section about the respective upright axis.

By providing a pivot member which is elongate in the forward working direction together with front and rear bearing surfaces which engage respective front and rear bearing surfaces of the socket on the main frame, the toolbar sections are provided with sufficient strength to resist large moments and torsional forces applied to the toolbar sections by the tillage units supported thereon. Accordingly, a large downforce can be applied to the tillage units while still supporting the toolbar sections and the tillage units thereon for angular adjustment relative to the forward working direction.

Preferably the front and rear bearing surfaces of each pivot member are generally convex.

Preferably the front and rear bearing surfaces of each first mounting assembly are parallel to one another and perpendicular to the forward working direction.

Preferably the pivot member comprises a tubular member oriented perpendicularly to the longitudinal direction of the toolbar section.

Preferably the track of each second mounting assembly comprises a slot formed in each of the upper and lower bearing surfaces and the following comprises pins protruding from upper and lower sides of the toolbar section which are slidably received within the respective slots.

Preferably each second mounting assembly includes a plurality of pin connections corresponding to respective angular orientations of the toolbar section. In this instance at least one pin member is preferably arranged to be received in a selected one of the pin connections to fix the toolbar section in a corresponding selected one of the angular orientations. Typically one pin member is secured in front of the toolbar section and one pin member is received rearward of the toolbar section to fix the toolbar section between the pin members in the forward working direction. In this instance pressure can be removed from any hydraulics used to reposition the toolbar sections during normal operation of the implement once pinned.

The pin connections may comprise apertures in both the upper and lower bearing surfaces such that the pin member is arranged to span through a corresponding pair of apertures in the upper and lower bearing surfaces respectively.

The implement preferably further comprises a plurality of hydraulic actuators connected between the main frame and respective ones of the toolbar sections adjacent the first end thereof so as to be arranged to displace the follower of the respective toolbar section along the respective track with extension and contraction of the hydraulic actuator, the hydraulic actuators and the toolbar sections lying in a common horizontal plane with one another.

When the frame comprises a centre section and two folding wing sections, the centre section preferably supports two forward toolbar sections and two rearward toolbar sections thereon and each folding wing section preferably supports one forward toolbar section and one rearward toolbar section thereon.

Each tillage unit may further comprise:
a mounting member mounted on the respective toolbar section; and
a pair of side plates supported parallel and spaced apart from one another on the mounting member and pivotally coupling the forward end of the trailing arm therebetween;
the biasing member being received between the two side plates above the trailing arm and being anchored at an upper end relative to the side plates.

Furthermore, each tillage unit may further comprise:
a socket at the trailing end of the trailing arm oriented transversely to a longitudinal direction of the trailing arm; and
a bearing assembly including a post arranged to be matingly received in the socket on the trailing arm and a hub supported rotatably on the post;
the hub supporting the coulter disk thereon.

According to another aspect of the present invention there is provided a tillage implement comprising:
a main frame supported for movement across the ground in a forward working direction;
a hitch arranged for connection to a towing vehicle;
a plurality of toolbar sections supported on the main frame so as to be oriented transversely to the forward working direction;
a plurality of tillage units supported on the toolbar sections respectively, each tillage unit comprising:
  a mounting member mounted on the respective toolbar section;
  a pair of side plates supported parallel and spaced apart from one another on the mounting member;
  a trailing arm extending generally rearwardly from a forward end pivotally coupled between the pair of side plates to an opposing trailing end such that the trailing end is movable upwardly from a normal working position to a deflected position;
  at least one coulter disk supported on the trailing end of the trailing arm so as to be arranged for tilling the ground; and
  a biasing member received between the two side plates above the trailing arm and being anchored at an upper end relative to the side plates so as to be arranged to bias the trailing arm downwardly towards the normal working position.

The enclosed configuration of the biasing member supported between the side plates ensures that the biasing member does not catch or collect undesirable debris such as corn stalks and the like thereon. Furthermore, in the event of breakage of the biasing member, the broken biasing member is safely contained between the side plates so as not to cause injury to surrounding persons or equipment.

Preferably the biasing member of each tillage unit is supported rearwardly of the respective toolbar section.

Preferably the upper end of the biasing member is adjacent a rear side of the respective toolbar section.

Preferably the forward end of the trailing arm is supported directly below the mounting member adjacent a bottom side of the respective toolbar section.

Preferably each tillage unit further comprises a rear plate spanning between the side plates rearwardly of the biasing member.

Preferably each tillage unit further comprises a channel member supported on a top side of the trailing arm at an intermediate location along the trailing arm which receives a bottom end of the biasing member therein so as to be arranged to anchor the bottom end of the biasing member relative to the trailing arm.

Preferably each tillage unit further comprises a threaded fastener coupled between the side plates below the trailing arm and spaced rearward from a pivot axis of the trailing arm relative to the side plates so as to be arranged to restrict downward movement of the trailing arm beyond the working position.

Preferably the biasing member is enclosed by the side plates, a rear plate connected between the side plates rearwardly of the biasing member and the trailing arm therebelow such that the biasing member is only removable from the tillage unit by removing said threaded fastener and pivoting the trailing arm downwardly beyond the working position.

Preferably each tillage unit further comprises a slider member mounted on each side of the trailing arm in sliding engagement with the respective side plate, the slider members being formed of a plastic material which is more slidable than the trailing arm.

According to another aspect of the present invention there is provided a tillage implement comprising:
a main frame supported for movement across the ground in a forward working direction;
a hitch arranged for connection to a towing vehicle;
a plurality of toolbar sections supported on the main frame so as to be oriented transversely to the forward working direction;
a plurality of tillage units supported on the toolbar sections respectively, each tillage unit comprising:
  a trailing arm extending generally rearwardly from a forward end supported on the respective toolbar section to an opposing trailing end such that the trailing end is movable upwardly from a normal working position to a deflected position;
  the trailing end of the trailing arm comprising a socket oriented transversely to a longitudinal direction of the trailing arm;
  a bearing assembly including a post arranged to be matingly received in the socket on the trailing arm and a hub supported rotatably on the post;
  a coulter disk supported on the hub on the trailing end of the trailing arm so as to be arranged for tilling the ground; and
  a biasing member arranged to bias the trailing arm downwardly towards the normal working position.

The mating socket and post configuration of mounting the bearing assembly and coulter disk onto the trailing arm permits the bearing assembly and coulter disk to be readily replaced if broken or damaged by simply removing a simple bolt or pin connection.

One embodiment of the invention will now be described in conjunction with the accompanying drawings in which:

BRIEF DESCRIPTION OF THE DRAWINGS

FIG. 14 s a top plan view of a third embodiment of the tillage implement;

FIG. 15 is a perspective view of one of the right centre section of the frame of the tillage implement of FIG. 14; and FIG. 16 is a perspective view of the right wing section of the frame of the tillage implement of FIG. 14.

In the drawings like characters of reference indicate corresponding parts in the different figures.

DETAILED DESCRIPTION

Figure 1:
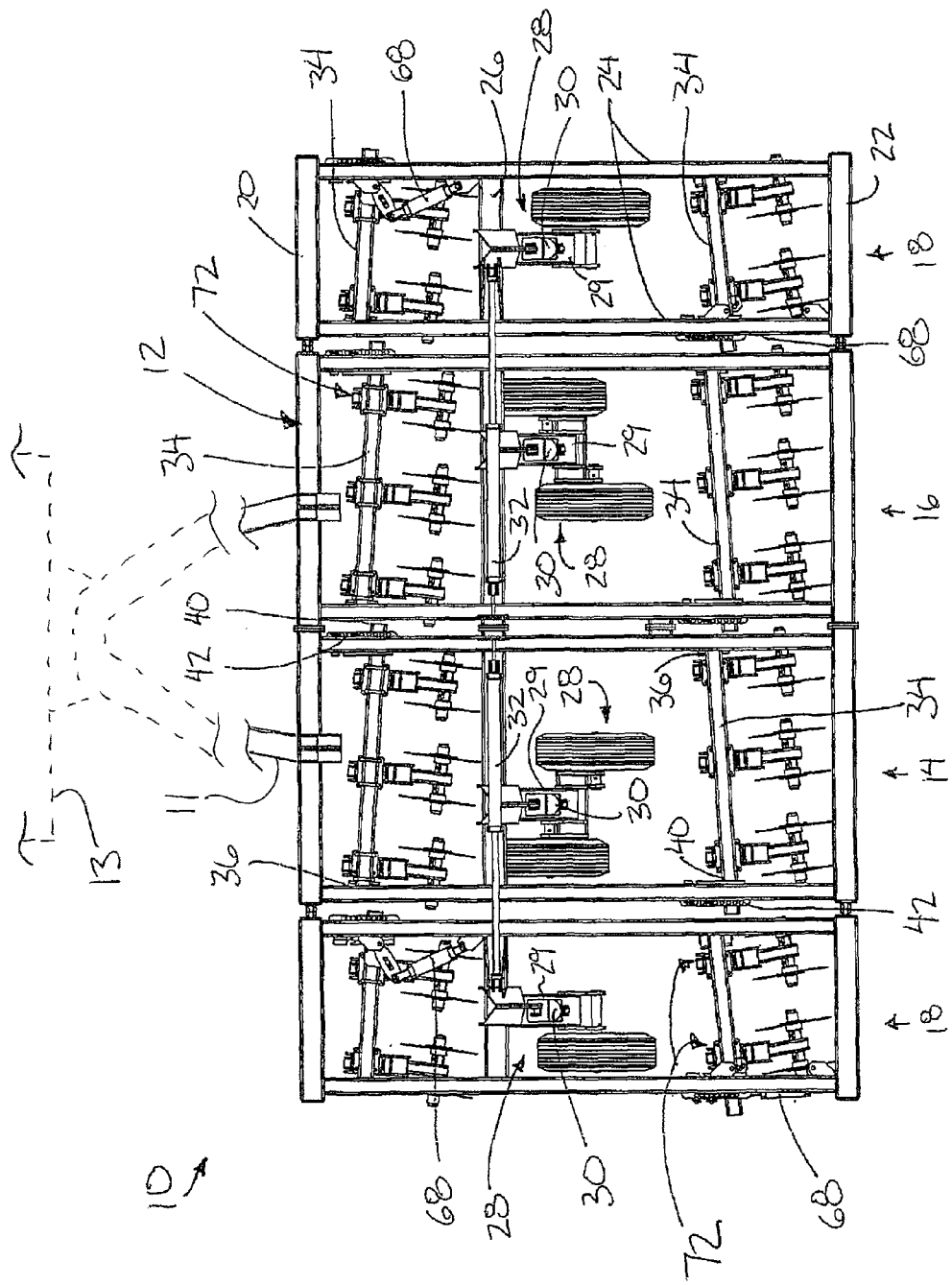
FIG. 1 is top plan view of the tillage implement according to a first embodiment in a field working position.
Figure 2:
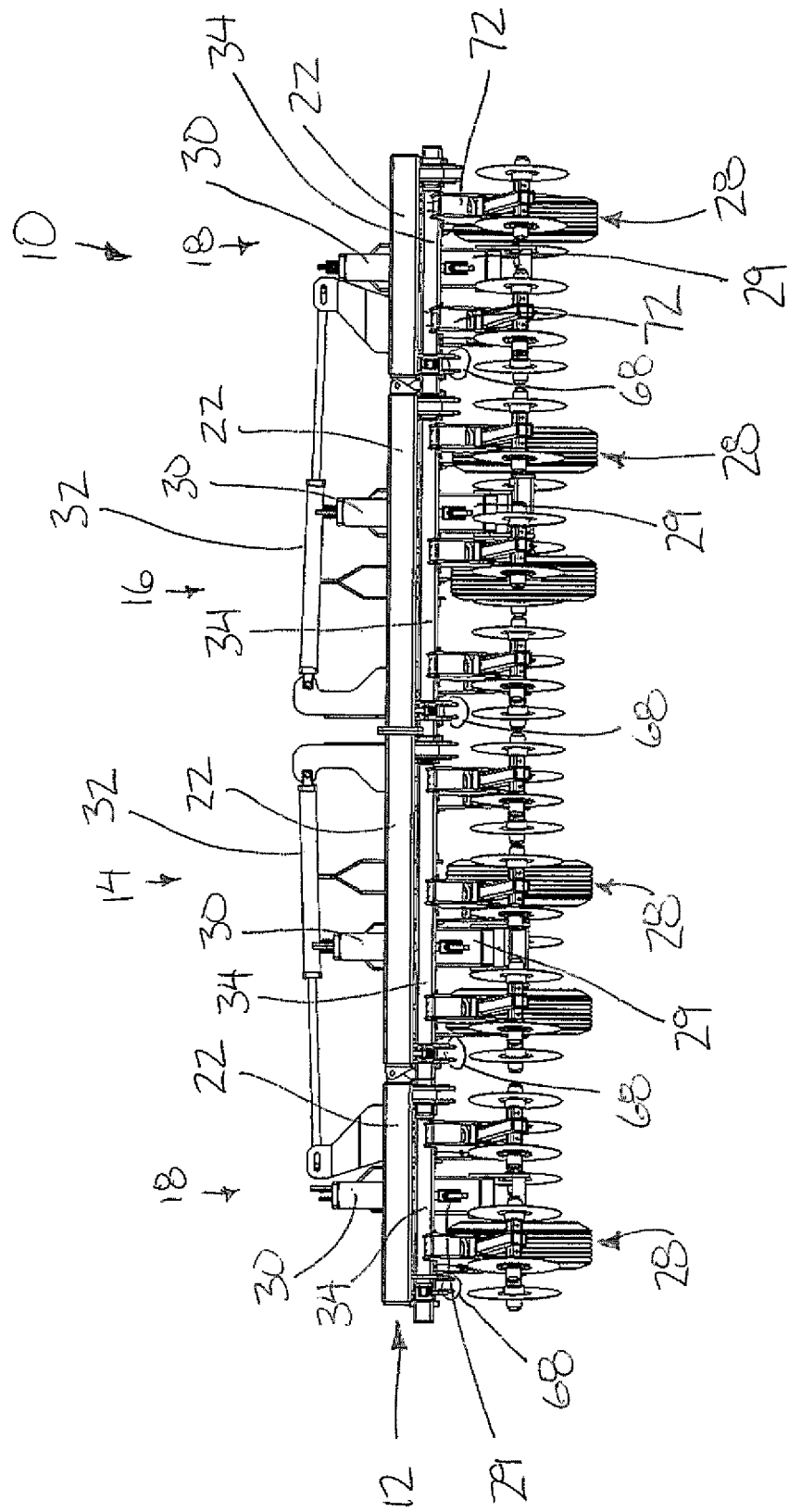
FIG. 2 is a rear elevational view of the tillage implement of FIG. 1 in the field working position.
Figure 3:
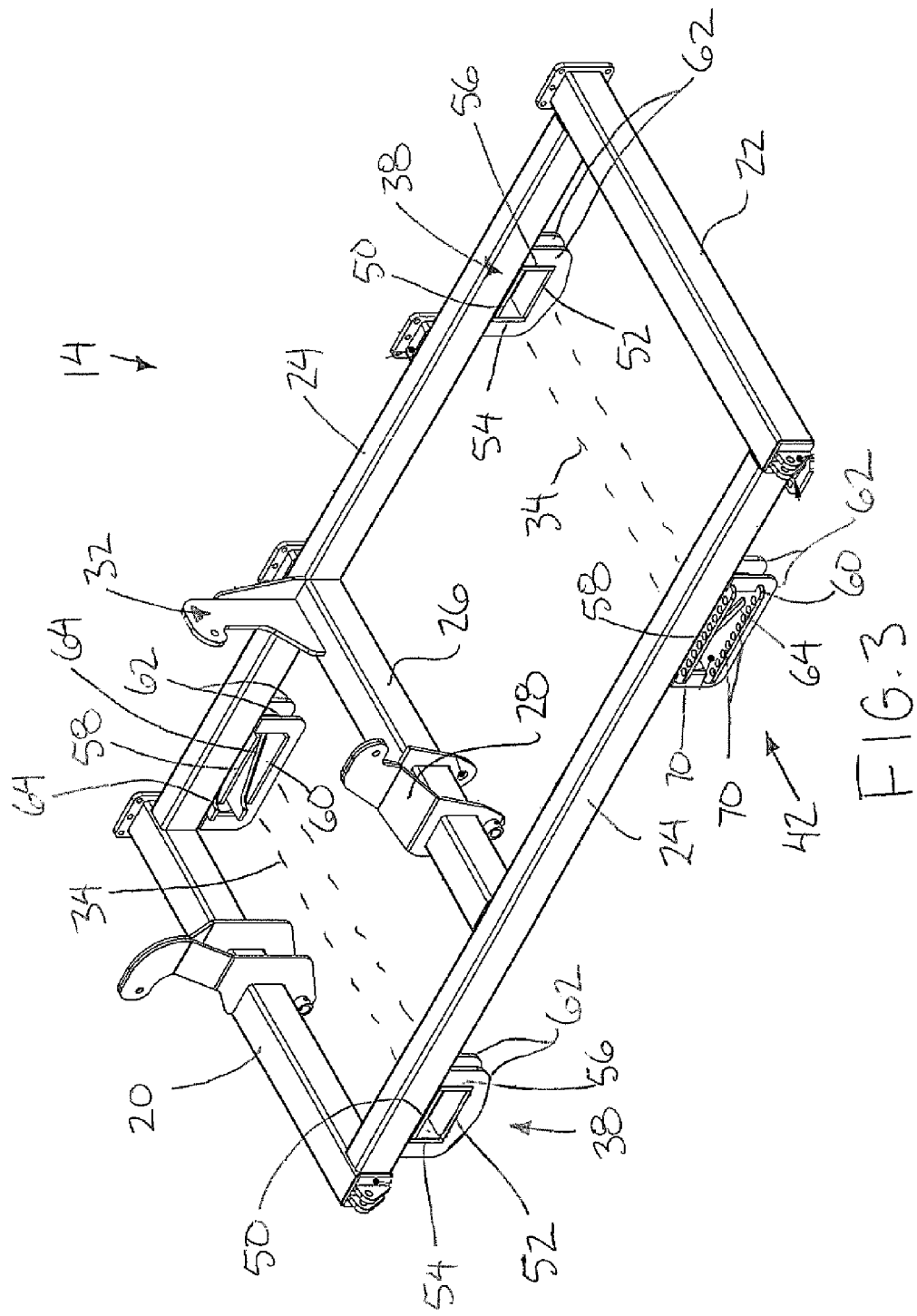
FIG. 3 is a perspective view of the left center section of the frame of the tillage implement of FIG. 1.
Figure 4:
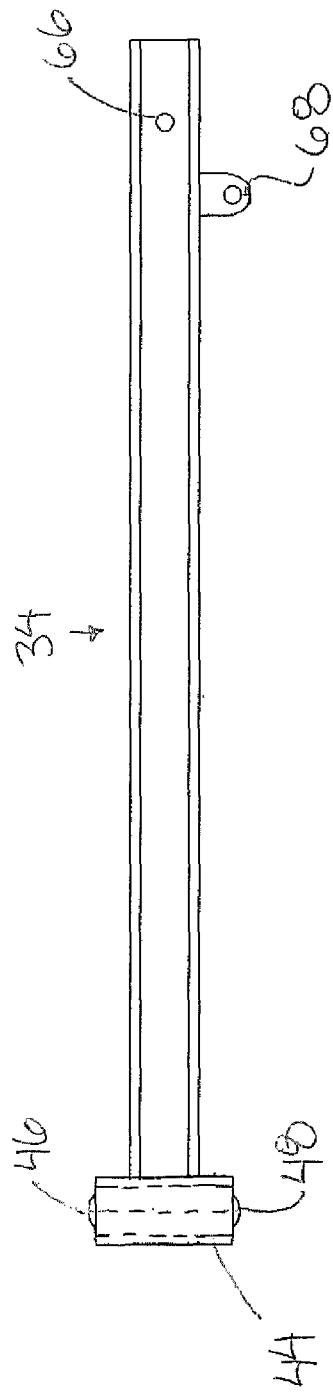
FIG. 4 is a top plan view of a toolbar section of one of the centre sections of the implement of FIG. 1.
Figure 5:
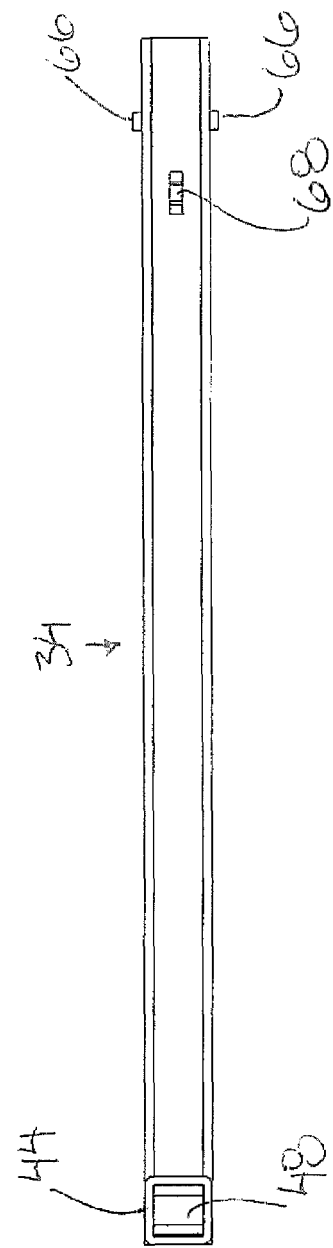
FIG. 5 is a rear elevational view of the toolbar section of FIG. 4.
Figure 6:
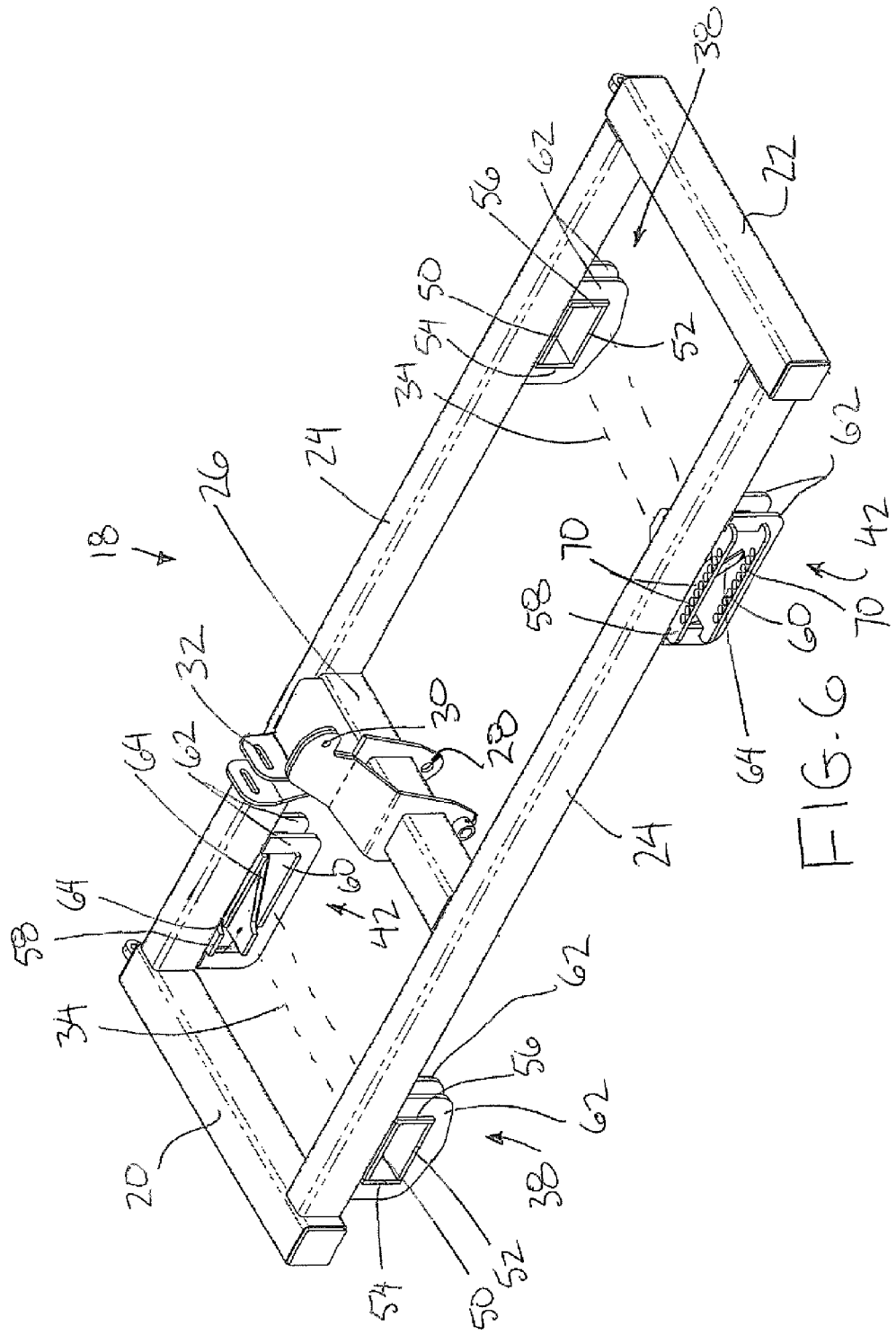
FIG. 6 is a perspective view of one of the wing sections of the frame of the tillage implement of FIG. 1.
Figure 7:
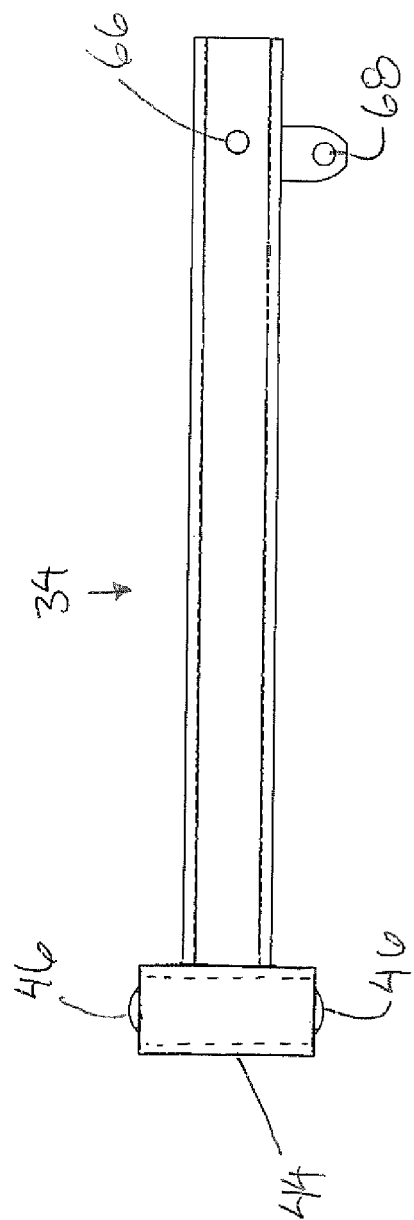
FIG. 7 is a top plan view of a toolbar section of one of the wing sections of the implement of FIG. 1.
Figure 8:
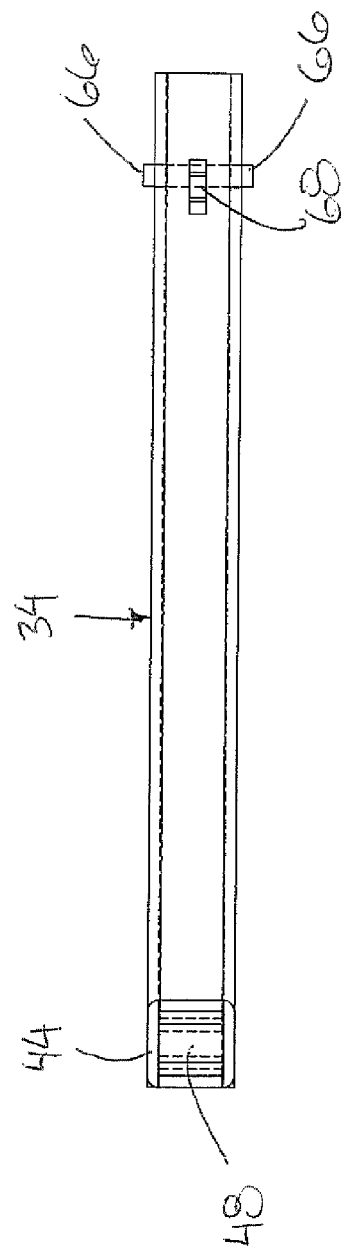
FIG. 8 is a rear elevational view of the toolbar section of FIG. 7.
Figure 9:
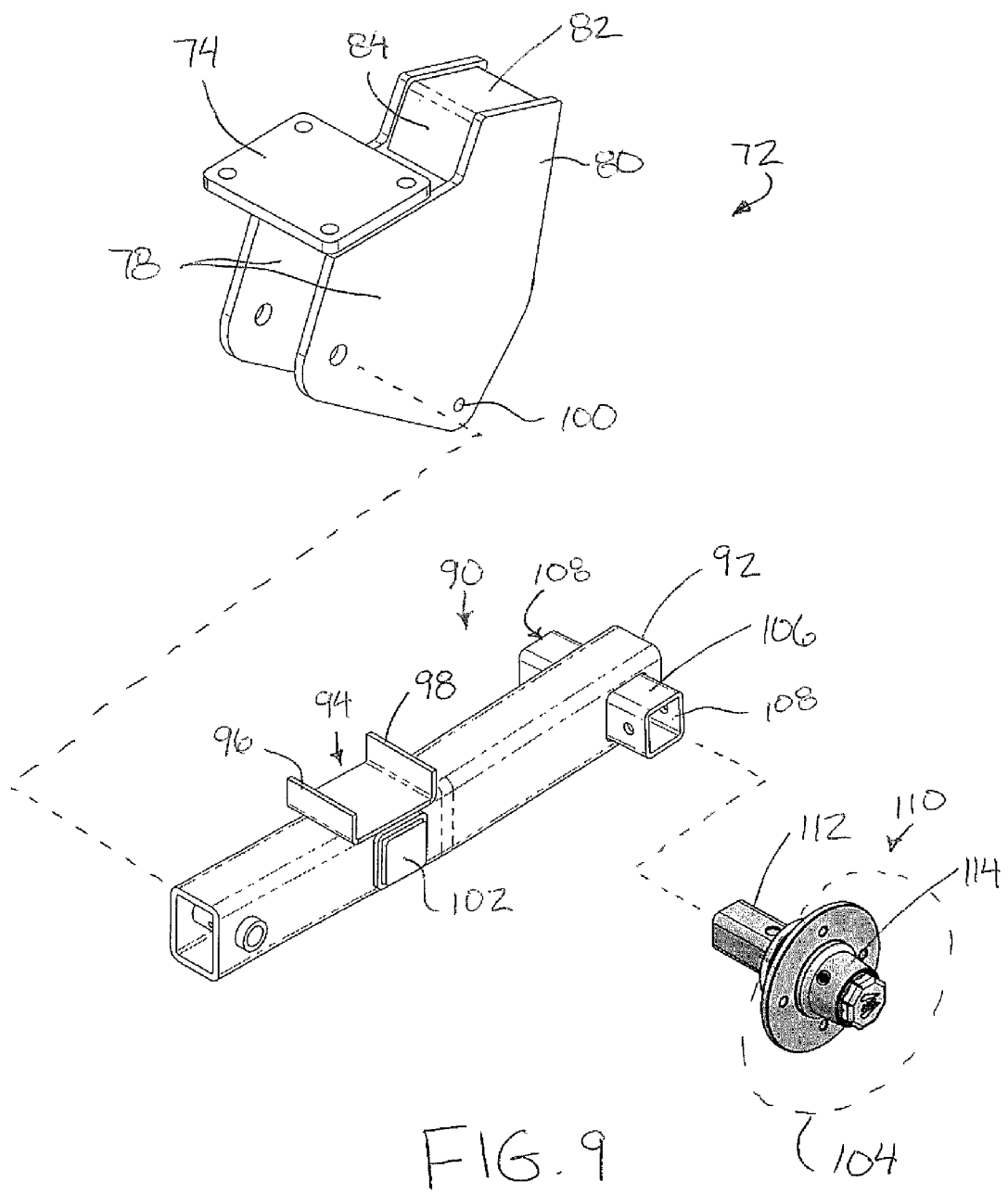
FIG. 9 is an exploded perspective view of one of the tillage units showing only one of the coulter disks in broken line.

Referring to the accompanying figures, there is illustrated a tillage implement generally indicated by reference numeral 10. The implement 10 is includes a hitch 11 as shown in FIG. 1 so as to be suited for for towing connection to a tractor 13 in a forward working direction for working the ground, for example as in vertical tillage. Although various embodiments of the tillage implement are illustrated in the accompanying figures, the common elements among the various embodiments will first be described.

The implement includes a main frame 12 including a center section comprised of a left section 14 and a right section 16 joined so as to be fixed to one another. The frame also includes two wing sections 16 coupled along opposing sides of the center section so as to be coupled to the left and right sections respectively. Each wing section 18 is pivotal relative to the respective one of the center sections about a respective fold axis oriented generally in the forward working direction.

Each of the left section, the right section and the two wing sections 18 comprises a front beam 20 perpendicular to the forward direction, a rear beam 22 spaced rearward of the front beam and two side beams 24 extending in the forward direction along opposing sides of the section between the rear beam and the front beam, such that the frame members of each section are in a rectangular configuration lying generally in a horizontal plane. Each section further comprises an intermediate beam 26 spanning between the two side beams parallel to the front and rear beam at an intermediate location spaced from both the front and rear beams.

In a field working position all of the frame members of the sections lie in a generally common horizontal plane with the front beams aligned with one another to form a common front end of the main frame while the rear beams are similarly all aligned along the rear end of the main frame. For transport, the two wing sections are folded upwardly and inwardly overtop the left and right sections of the center section respectively into a folded transport position. Folding of the wing sections is accomplished by a pair or hydraulic actuators 32 coupled at a cylinder end centrally on the center section of the main frame and coupled at piston ends to respective actuating arms on the wings for raising the wings upwardly and inwardly as the hydraulic actuators 32 are retracted.

Each of the left, right and two wing sections further comprises at least one wheel assembly 28 supported on the intermediate beam thereof. Each wheel assembly includes a leg 29 pivotal about a horizontal axis in a lateral direction oriented perpendicularly to the forward working direction. Each leg is pivoted at a forward upper end to the respective intermediate beam to extend generally downward and rearward to a bottom end. The bottom ends of the legs support respective wheels thereon for rolling movement in the forward working direction.

A hydraulic actuator 30 is associated with each wheel assembly and is connected between the leg 29 and the intermediate beam such that extension and retraction of the hydraulic actuator causes the wheels of the wheel assembly to be raised and lowered relative to the frame sections. By raising the wheels relative to the frame, the frame can be towed across the field in working configuration. Alternatively by lowering the wheels relative to the frame, the frame is raised and carried solely on the wheels of the wheel assemblies for transport in a disengaged position. The wheels of the center sections remain lowered for supporting the implement thereon in the transport position when the wings are folded up.

Each of the sections of the main frame supports a plurality of tool bar sections 34 thereon. Each tool bar section comprises a rigid tube member of generally rectangular cross section which supports a plurality of tillage units at spaced positions therealong. Each of the left section, the right section and the two wing sections support one tool bar section adjacent the forward end thereof and one tool bar section adjacent the rearward end thereof with an equal number of tillage units 72 on the front and rear tool bar section within each section of the main frame.

Each tool bar section 34 is supported at a respective first end 36 on one of the side beams of the respective frame section by a first mounting assembly 38. Similarly each tool bar section includes an opposing second end 40 supported on the other side beam of the respective frame section by a second mounting assembly 42. Within each frame section the first ends of the front and rear tool bar sections are supported on opposing side beams of the section such that the two tool bar sections of each frame section extend in opposing lateral directions from the first end to the second end thereof.

The first end of each tool bar section comprises a pivot member 44 in the form of a square rigid tube mounted perpendicularly to the longitudinal direction of the respective tool bar section in a generally T-shaped configuration. The pivot member thus extends generally in the forward working direction of the implement between a front bearing surface 46 and a rear bearing surface 48. Each of the front and rear bearing surfaces are curved about a vertical axis so as to be generally convex in shape.

Each first mounting assembly comprises an upper plate 50 directly adjacent the bottom side of the respective side beam and a lower plate 52 parallel and spaced below the upper plate by the thickness of the pivot member 44 for snugly and slidably receiving the pivot member therebetween. Each first mounting assembly further comprises a front plate 54 and a rear plate 56 extending between the upper and lower plates at opposing front and rear ends thereof so as to be parallel to one another and perpendicular to the forward working direction. The four plates of the first mounting assembly together define a socket with an opening facing in the lateral direction to receive the first end of the respective tool bar section therein.

The front and rear plates define respective front and rear bearing surfaces of the mounting assembly which engage the front and rear bearing surfaces of the pivot member 44. Due to the convex shape of the front and rear bearing surfaces of the pivot member, the socket of the first mounting assembly does not restrict pivotal movement of the tool bar section about a vertical axis generally through the pivot head. Due to the opening of the socket in the lateral direction, the mounting assembly also allows sliding of the tool bar section relative to the first mounting assembly in the lateral direction, perpendicular to the forward direction. Engagement between the respective front and rear bearing surfaces however fixes the position of the pivot member in the forward working direction relative to the mounting frame.

The second mounting assembly similarly comprises an upper plate 58 mounted directly adjacent the bottom side of the respective side beam and a lower plate 60 mounted parallel and spaced below the upper plate by a suitable distance to snugly and slidably receive the square cross section of the tool bar section therebetween. Similarly to the lower plate of the first mounting assembly, the lower plate of the second mounting assembly is further supported by a pair of support plates 62 oriented in respective vertical planes parallel and spaced apart from one another and oriented in the forward working direction The two support plates are in a generally U-shaped configuration so as to be coupled at opposing ends to the bottom side of the respective side member while extending below the lower plate in fixed connection therewith to maintain the lower plate in fixed parallel relation with the upper plate. In the first mounting assembly, the support plates are also fixed to the front and rear plates with the support plates being supported on the outer side thereof.

In the second mounting assembly the upper and lower plates are longer in the working direction than the dimension of the tube of the tool bar section such that the tool bar section is slidable in the working direction along the length of the socket formed by the upper and lower plates of the second mounting assembly. Sliding of the tool bar section at the second end in the working direction effectively pivots the tool bar section about the first end constrained in the socket in the first mounting assembly.

Each of the upper and lower plates comprises a slot 64 formed therein which extends at an inclination to the forward working direction. The slots in the upper and lower plates receive a pair of followers 66 fixed on the upper and lower surfaces of the tube forming the tool bar section. The two followers comprise upper and lower pins respectively slidably received within the slots of the upper and lower plates. In this manner, when displacing the second end of the tool bar section in the working direction, the followers within the respective slots in the second mounting assembly which define a track of the second mounting assembly effectively guide a corresponding movement of the tool bar section in a lateral direction. The amount of lateral displacement ensures that the tillage units of the forward and rearward ones of the tool bar sections remain aligned with one another despite the angular adjustment of the tool bar sections relative to the main frame.

In preferred embodiments a hydraulic actuator 68 is coupled to each tool bar section adjacent the second end thereof at a piston end of the actuator. The actuator typically extends in the direction of the adjacent side beam of the respective frame section to a cylinder end pivotally coupled to the respective side beam.

Extension and retraction of the hydraulic actuator causes the first end of the respective tool bar section to be slidably displaced in the forward working direction relative to the main frame by sliding the follower along the respective track for adjusting the angular orientation of the tool bar section relative to the frame about an upright axis extending through the pivot member at the second end of the toolbar section. The hydraulic actuators 68 are connected between the main frame and respective ones of the toolbar sections adjacent the first end of the respective toolbar sections. In preferred embodiments, the hydraulic actuators 68 extend generally horizontally in the forward working direction at a common elevation with the toolbar sections such that the toolbar sections and the hydraulic actuators all lie in a common horizontal plane with one another. The force of extension and contraction of the actuators 68 acting on the respective is thus aligned with the toolbar sections and with the sliding direction of the followers within the respective tracks so as to prevent any undesirable moments being applied to the toolbar sections.

The hydraulic actuators are suitably sized so as to be arranged to fully support and fix the orientation of the toolbar sections in the forward working direction even if the pins are not used to anchor the toolbar sections. In this manner, the hydraulic actuators can be used to adjust the angular orientation of the toolbar sections while the implement is in use and being towed across a field.

The hydraulic actuators 68 are typically connected in parallel by supplying hydraulic fluid under pressure to splitter valves which evenly distribute the hydraulic fluid to the actuators such that the actuators are commonly extended and retracted and all of the toolbar sections are simultaneously adjusted to a common angular orientation. In this instance, the actuators 68 are substantially identical in configuration with one another so as to have an equal stroke length in response to an equal amount of fluid directed thereto.

In an alternative arrangement, the hydraulic actuators 68 can be connected in series with one another in a phasing or master and slave configuration. In this instance, each actuator is proportionately sized relative to a previously connected actuator in the series such that the actuators all have an equal stroke length simultaneously with one another in response to fluid under pressure being supplied to a first one of the actuators in the series.

To maintain orientation of the tool bar section at a selected angular orientation relative to the frame section a plurality of pin connections 70 in the form of a row of apertures are provided in each of the upper and lower plates of the second mounting assembly in which each aperture in the upper plate is aligned with a corresponding aperture in the lower plate to define a corresponding pair. The apertures are located in the portion of the plate which protrudes laterally outward from the side beam upon which they are supported to provide ready access to the pin connections. To fix the position of the tool bar section relative to the frame a pair of pin members are inserted through the pin connection apertures directly adjacent both the front and rear sides of the tool bar section adjacent the second end thereof by inserting each pin member through a corresponding pair of apertures. The two pin members together restrict movement of the second end of the tool bar section in either direction aligned with the forward working direction.

In some instances, angular adjustment of the tool bar sections can be performed manually with the pin connection being used alone to retain the selected orientation of the tool bar sections. Even when using hydraulic actuators to displace the orientation of the tool bar sections however, the pin members in the pin connections can be used to maintain the orientation even after the hydraulics are disconnected or relieved of pressure for more precisely retaining the position of the tool bar sections than relying on hydraulics alone. No pins are used when it is desirable to allow adjustment of the angular orientation during normal use in the field working position as the hydraulics alone are used in this instance to lock the position of the toolbar sections at a selected orientation.

As noted above, each tool bar section includes a plurality of tillage units 72 supported at spaced positions thereon in the longitudinal direction of the tool bar section.

Each tillage unit generally comprises a mounting member 74 in the form of a flat plate arranged for securement directly to the underside of the respective tool bar section by U-bolts 76 extending over and around the respective tool bar.

As shown in the accompanying figures, the side plates 78 are fixed to the mounting member 74 so as to be parallel to one another, spaced apart from one another in the lateral direction of the toolbar section and oriented in respective vertical planes aligned with the forward working direction. Each side plate includes a main portion extending generally downwardly and rearwardly from the mounting member on the tool bar as well as an upper portion 80 extending generally upwardly and rearwardly behind the tool bar from the main portion.

Figure 10:
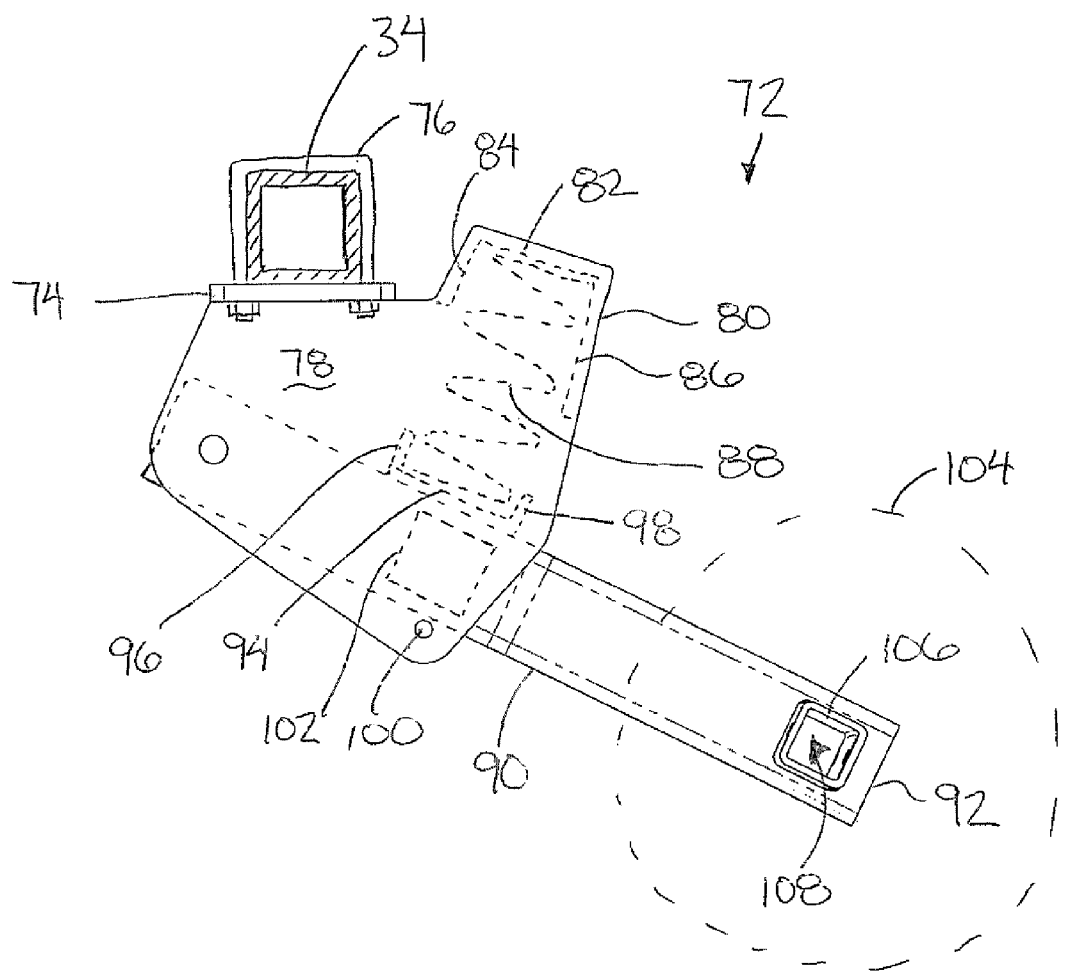
FIG. 10 is a side elevational view of one of the tillage units supported on a respective toolbar section of the implement.

Each tillage unit further includes a top plate 82 coupled between the top sides of the two side plates at the upper portion 80 behind the tool bar. A depending plate 84 extends downward from the front edge of the top plate between the front edges of the upper portions of the two side plates to a bottom end near the rear edge of the mounting member at the rear of the tool bar. A rear plate 86 is connected between the rear edges of the two side plates at the upper portion thereof so as to be connected to the rear edge of the top plate. In this manner, the rear plate, the depending plate and the two side plates together form a pocket with the top plate for receiving the top end of a spring member 88 therein such that the top end of the spring member is fixed relative to the side plates at a location spaced above the trailing arm in operation. As shown in FIG. 10, the spring member 88 is a linear acting coil spring which is oriented to provide a downward biasing force to a trailing arm 90 of the tillage unit.

The trailing arm 90 comprises a rigid tube of square cross section having a front end which is pivotally coupled between the two side plates at a location directly below the front side of a tool bar and a front edge of the mounting plate. The trailing arm 90 extends generally downward and rearward at an inclination between the side plates to extend outwardly beyond the side plates towards a trailing end 92. A channel 94 is supported on the top side of the arm at an intermediate location between the side plates so as to be aligned substantially below the top plate 82. The channel 94 comprises a front flange 96 and a rear flange 98 extending upward from the top side of the trailing arm at spaced positions in the longitudinal direction of the trailing arm such that the front and rear flanges together with the two side plates similarly form a pocket for locating the bottom end of the spring member therein and for fixing the bottom end of the spring member relative to the trailing arm. The downward biasing force provided by the spring member thus biases the trailing arm downward into a working position while allowing the trailing arm to be pivoted upwardly at the rear end thereof against the force of the spring into a deflected position.

A retainer bolt 100 is coupled between the two side plates at a location below the trailing arm substantially in alignment with the spring member thereabove such that the retainer bolt acts as a stop which prevents downward movement of the trailing arm beyond the working position. The configuration of the two side plates with the trailing arm received therebetween below the spring and with the configuration of the pocket receiving the top end of the spring, the spring is effectively enclosed between the two side plates and only removable from the mounted position by removing the retainer bolt 100 to pivot the trailing arm downwardly and outwardly from between the two side plates. As shown in FIG. 10, the side plates 78 span a full height of the spring member 88 from the top plate 82 forming the pocket which receives the top end of the spring member therein to the retainer bolt 100 below the channel 94 on the trailing arm 90 which receives the bottom end of the spring member therein. Furthermore, the rear edge of the side plates 78 are shown to be in a rearward trailing relationship with the spring member 88 along a full height of the spring member so as to fully enclose the spring member at both laterally opposing sides thereof.

The trailing arm includes two slider members 102 supported on opposing sides of the trailing arm for pivotal movement therewith relative to the side plates. The slider members 102 remain in sliding engagement with respective inner surfaces of the two side plates and are formed of a suitable plastic material having a lower friction than steel so as to be more slidable than the trailing arm relative to the side plates.

Each tillage unit supports two coulter disks at the trailing end of the trailing arm such that the disks 104 are arranged for tilling engagement with ground. The disks are supported by a mounting member 106 fixed to the trailing end of the trailing arm to extend perpendicularly to the longitudinal direction thereof in a substantially horizontal orientation. The opposing ends of the mounting member remain open to define a pair of opposed sockets 108 oriented perpendicularly to the forward working direction. Each socket receives a bearing assembly 110 mounted therein. More particularly each bearing assembly comprises a mounting post 112 slidably received in mating engagement with the respective socket by forming the mounting posts and the sockets to have a corresponding square cross section. An outer end of each mounting post supports a respective hub 114 thereon such that the hub is rotatable relative to the post by respective bearings. Each disk 104 is supported on a respective hub 114 which is rotatably supported on a respective post received within a respective one of the two sockets 108 of the mounting member. The posts are retained within the respective sockets by a suitable pin or bolt extending through transverse apertures in the mounting member and posts in this matter a damaged disk or bearing assembly can be readily removed and replaced using only a single pin connection.

Due to the trailing configuration of the disks 104 relative to the respective tool bars upon which they are supported, angular adjustment of the tool bar sections relative to the main frame affects the lateral position of the disks 104 relative to the frame. The inclination of the slots forming the tracks of the second mounting assemblies are configured such that the resulting lateral displacement of the disks of the tillage units when angularly adjusting the tool bar sections is accommodated for by laterally displacing the tool bar section in the longitudinal direction of the tool bars section with the corresponding movement of the second ends of the toolbar sections in the forward working direction. By orienting the front and rear tool bar sections of each frame section in opposing lateral directions relative to one another, the followers within the respective slots of the second mounting assemblies maintain alignment of the disks of the front and rear tool bar sections.

Turning now more particularly to the embodiment of FIG. 1, the wing sections 18 in this instance are narrower in the lateral direction than the left and right center sections. In this instance, the wheel assemblies of the wing sections only require a single wheel for support instead of the dual wheels of the center section wheel assemblies. Due to the narrower lateral width, the tool bar sections of the wings are shorter in the lateral direction and only support two tillage units thereon instead of the longer tool bar sections of the center sections of the frame which each support three tillage units thereon respectively. The first embodiment also differs from the remaining embodiments in that additional linkages are provided for coupling the actuators 68 to the toolbar sections of the wing sections such that the first ends of the tool bar sections on the wing sections are not displaced in the working direction as far along their respective tracks as the center sections. This ensures a similar angular adjustment among the different tool bar sections despite the varying length thereof.

Figure 11:
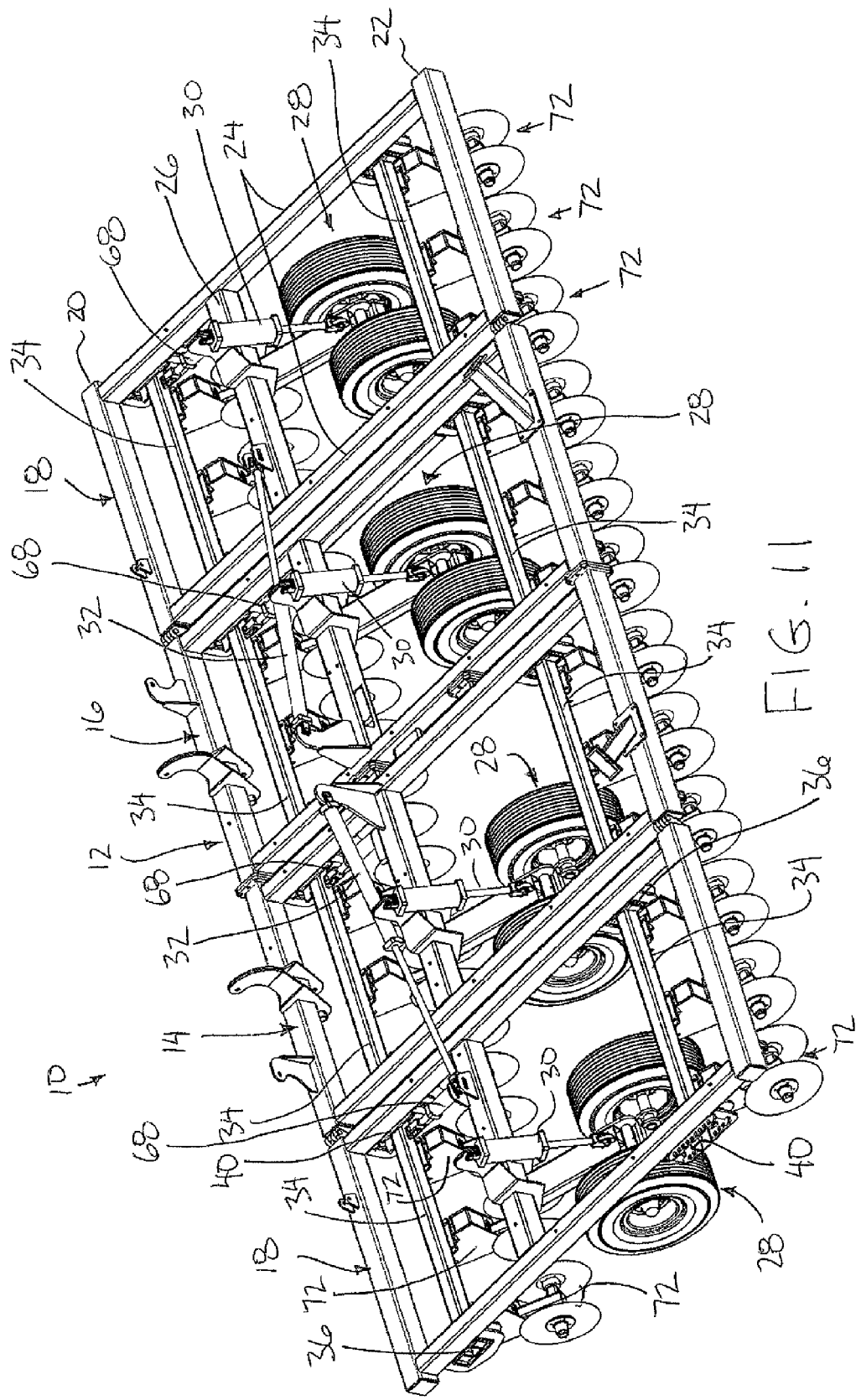
FIG. 11 is a perspective view of a second embodiment of the tillage implement.
Figure 12:
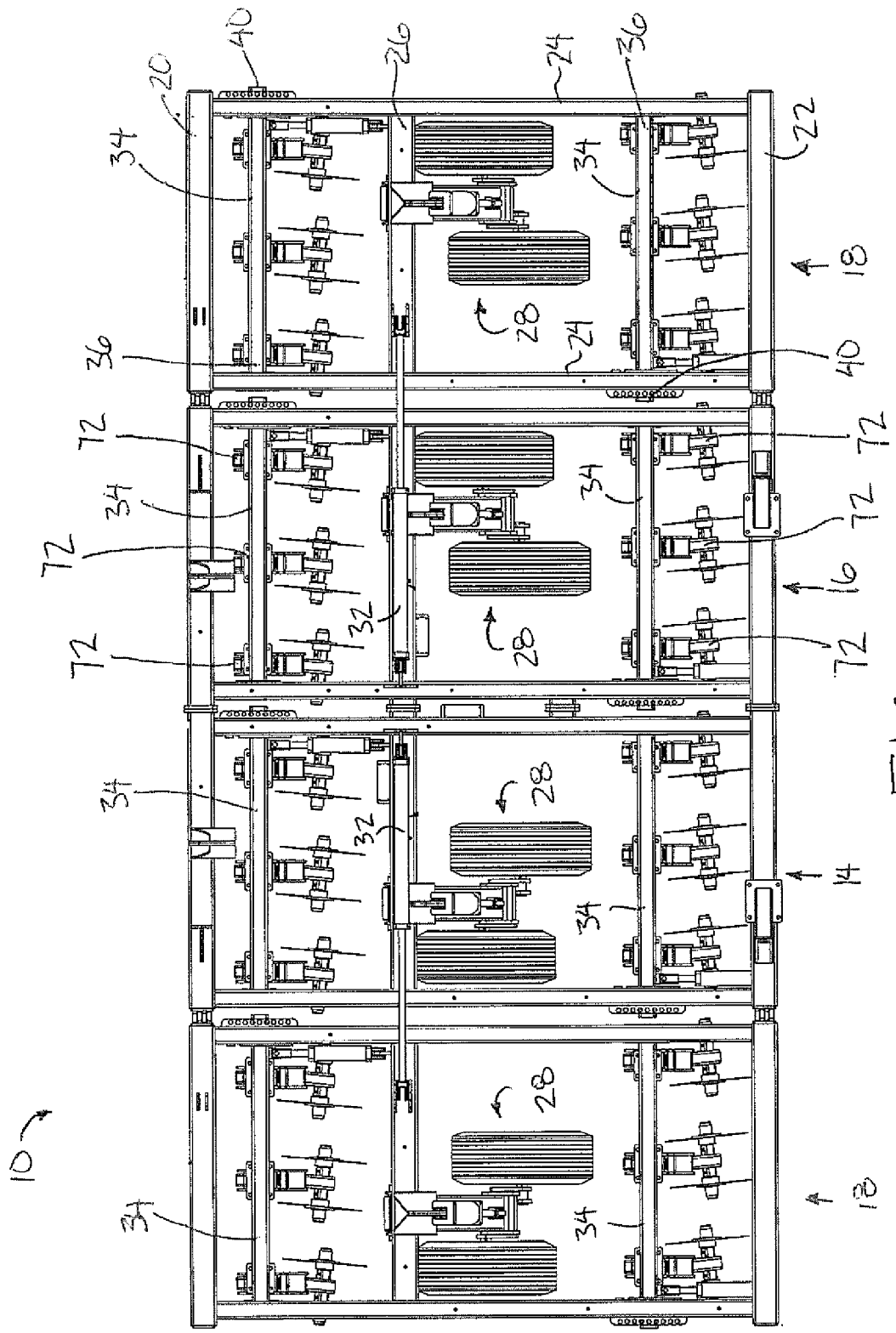
FIG. 12 is a top plan view of the of the implement of FIG. 11 in the field working position.
Figure 13:
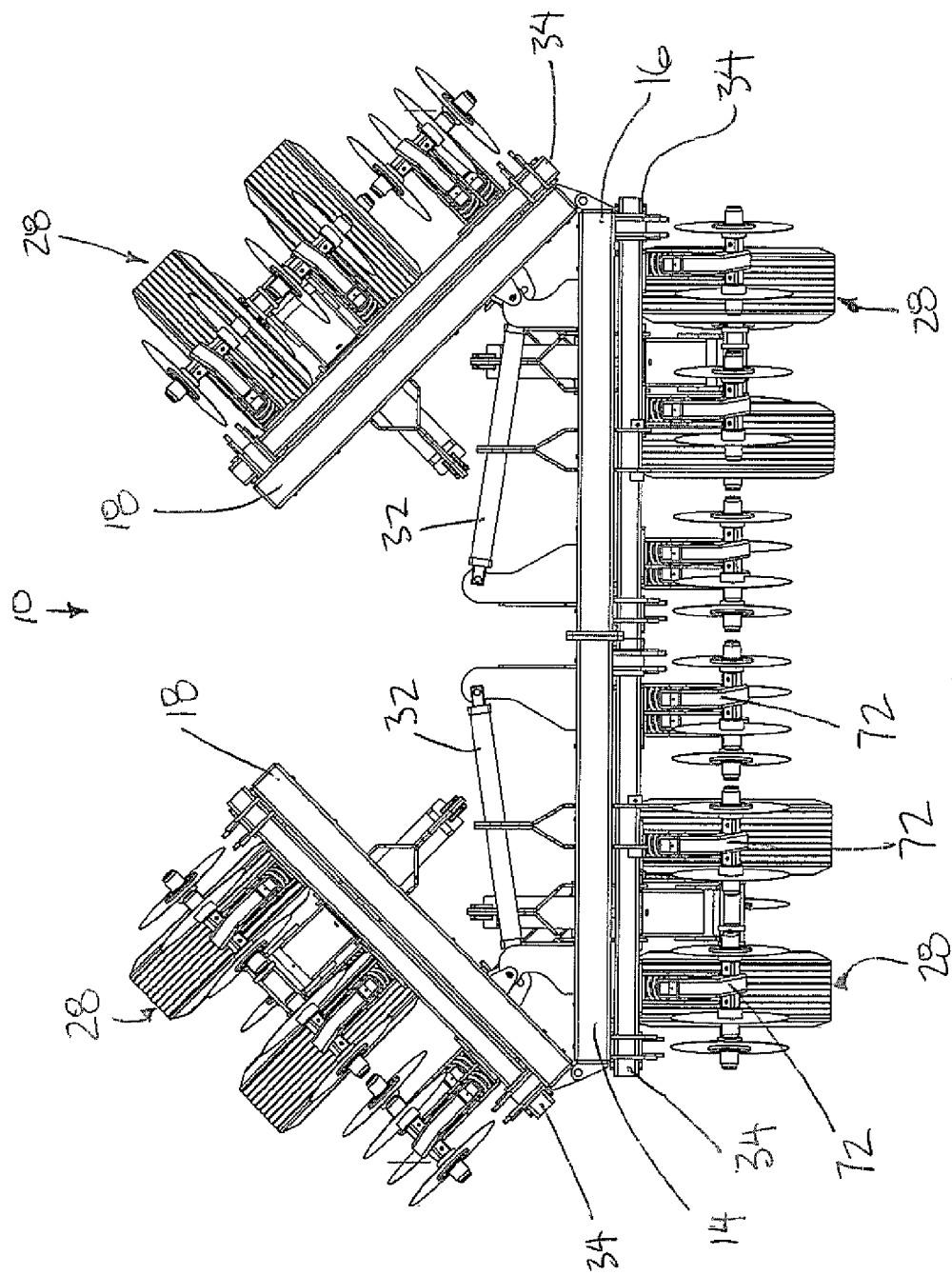
FIG. 13 is a rear elevational view of the implement of FIG. 11 in a folded transport position.

Turning now to the embodiment of FIGS. 11 through 13, each of the sections of the frame including the left section 14 and right section 16 of the center section as well as the two wing sections 18 are all substantially identical in width. A single dual-wheel wheel assembly supports each of the sections of the frame in this instance. Furthermore, all of the toolbar sections are the same length for supporting three tillage units thereon. When the sections each have a lateral width in the order of six feet, the collective width in the field working position is 24 feet. By arranging all of the toolbar sections to be identical to one another, the first ends are all displaced by an equal amount in the forward working direction to vary the angular orientation of the toolbar sections such that a common stroke length for all of the cylinders of the actuators 68 is appropriate when the actuators are mounted in a common configuration relative to each respective toolbar.

Turning now to the embodiment of FIGS. 14 through 16, in this instance, all of the frame sections are again equal in width, but the width is increased relative to the previous embodiment from six feet to eight feet per section such that the total width in the lateral direction of the implement in the field working position in this instance is thirty-two feet. To accommodate the extra mass of the implement in the transport position, each of the left and right sections of the center section include two wheel assemblies of dual wheel configuration each to adequately support the frame for rolling movement along the ground. The wing sections each include a single wheel assembly of dual wheel configuration in this instance for supporting the wing sections for rolling movement along the ground in the field working position. Due to the greater lateral width of the frame sections, the toolbar sections are accordingly longer in the embodiment of FIGS. 14 through 16 such that four tillage units can be supported on each toolbar section. Furthermore a greater displacement of the first ends of the toolbar sections is required to effect the same variation in angular orientation as compared to the previous embodiment such that a greater number of pin positions are provided in the mounting members that support the first ends of the tool bars respectively.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:
1. A tillage implement comprising:
a main frame arranged for connection to a towing vehicle so as to be supported for movement across the ground in a forward working direction;
a plurality of toolbar sections supported on the main frame so as to be oriented transversely to the forward working direction;
each toolbar section extending in a respective longitudinal direction between a first end coupled to the main frame by a respective first mounting assembly and a second end coupled to the main frame by a respective second mounting assembly such that the toolbar section is adjustable about an upright axis to vary an angle of the toolbar section relative to the forward working direction; and
a plurality of tillage units supported on the toolbar sections respectively, each tillage unit comprising:
a trailing arm extending generally rearwardly from a forward end supported on the respective toolbar section to an opposing trailing end such that the trailing end is movable upwardly from a normal working position to a deflected position;
a coulter disk supported on the trailing end of the trailing arm so as to be arranged for tilling the ground; and
a biasing member arranged to bias the trailing arm downwardly towards the normal working position;
the first end of each toolbar section comprising a pivot member which is elongate generally in the forward working direction between front and rear bearing surfaces of the pivot member which are longitudinally opposed such that the pivot member extends transversely to the longitudinal direction of the toolbar section;
each first mounting assembly comprising a socket arranged to receive the pivot member matingly therein, the socket including front and rear bearing surfaces engaging respective ones of the front and rear bearing surfaces of the pivot member such that:
the pivot member is fixed relative to the main frame in the forward working direction;
the pivot member is slidable relative to the main frame in a lateral direction perpendicular to the forward working direction; and
the pivot member locates said upright axis of the toolbar section extending therethrough;
each second mounting assembly comprising upper and lower bearing surfaces slidably receiving the toolbar section therebetween;
the second end of each toolbar section comprising a follower in mating engagement with a respective track formed on the bearing surfaces of the respective second mounting assembly;
the track of each second mounting assembly being arranged to guide movement of the respective toolbar section in the lateral direction as the second end of the toolbar section is displaced in the forward working direction by pivoting the toolbar section about the respective upright axis.

2. The implement according to claim 1 wherein the front and rear bearing surfaces of each pivot member are generally convex.

3. The implement according to claim 2 wherein the front and rear bearing surfaces of each first mounting assembly are parallel to one another and perpendicular to the forward working direction.

4. The implement according to claim 1 wherein the pivot member comprises a tubular member oriented perpendicularly to the longitudinal direction of the toolbar section.

5. The implement according to claim 1 wherein the track of each second mounting assembly comprises a slot formed in each of the upper and lower bearing surfaces and the following comprises pins protruding from upper and lower sides of the toolbar section which are slidably received within the respective slots.

6. The implement according to claim 1 wherein each second mounting assembly includes a plurality of pin connections corresponding to respective angular orientations of the toolbar section and wherein there is provided a pin member arranged to be received in a selected one of the pin connections to fix the toolbar section in a corresponding selected one of the angular orientations.

7. The implement according to claim 6 wherein the pin connections comprises apertures in both the upper and lower bearing surfaces and wherein the pin member is arranged to span through a corresponding pair of apertures in the upper and lower bearing surfaces respectively.

8. The implement according to claim 1 further comprising a plurality of hydraulic actuators connected between the main frame and respective ones of the toolbar sections adjacent the first end thereof so as to be arranged to displace the follower of the respective toolbar section along the respective track with extension and contraction of the hydraulic actuator, the hydraulic actuators and the toolbar sections lying in a common horizontal plane with one another.

9. The implement according to claim 1 wherein each tillage unit further comprises:
    a mounting member mounted on the respective toolbar section; and
    a pair of side plates supported parallel and spaced apart from one another on the mounting member and pivotally coupling the forward end of the trailing arm therebetween;
    the biasing member being received between the two side plates above the trailing arm and being anchored at an upper end relative to the side plates.

10. The implement according to claim 1 wherein each tillage unit further comprises:
    a socket at the trailing end of the trailing arm oriented transversely to a longitudinal direction of the trailing arm; and
    a bearing assembly including a post arranged to be matingly received in the socket on the trailing arm and a hub supported rotatably on the post;
    the hub supporting the coulter disk thereon.

11. A tillage implement comprising:
    a main frame arranged for connection to a towing vehicle so as to be supported for movement across the ground in a forward working direction;
    a plurality of toolbar sections supported on the main frame so as to be oriented to extend in a lateral direction transversely to the forward working direction;
    a plurality of tillage units supported on the toolbar sections respectively, each tillage unit comprising:
        a mounting member mounted on the respective toolbar section;
        a pair of side plates supported parallel to one another and spaced apart from one another in the lateral direction of the respective toolbar section on the mounting member, and oriented in the forward working direction;
        a trailing arm extending generally rearwardly from a forward end pivotally coupled between the pair of side plates to an opposing trailing end such that the trailing end is movable upwardly from a normal working position to a deflected position;
        at least one coulter disk supported on the trailing end of the trailing arm so as to be arranged for tilling the ground; and
        a biasing member comprising a spring received laterally between the two side plates above the trailing arm, the spring extending between an upper end supported in fixed relation to the side plates at a location spaced above the trailing arm and a bottom end supported in fixed relation to the trailing arm so as to be arranged to bias the trailing arm downwardly towards the normal working position; and
        a stop member coupled between the side plates below the trailing arm and spaced rearward from a pivot axis of the trailing arm relative to the side plates so as to be arranged to restrict downward movement of the trailing arm beyond the working position;
        wherein the side plates span a full height of the spring from the upper end supported in fixed relation to the side plates to the stop member below the bottom end of the spring; and
        wherein a rear edge of each side plate is in a rearward trailing relationship with the spring along said full height of the spring so as to fully enclose the spring at both laterally opposing sides thereof.

12. The implement according to claim 11 wherein the biasing member of each tillage unit is supported rearwardly of the respective toolbar section.

13. The implement according to claim 11 wherein the upper end of the biasing member is adjacent a rear side of the respective toolbar section.

14. The implement according to claim 11 wherein the forward end of the trailing arm is supported directly below the mounting member adjacent a bottom side of the respective toolbar section.

15. The implement according to claim 11 wherein each tillage unit further comprises a rear plate spanning between the side plates rearwardly of the biasing member.

16. The implement according to claim 11 wherein each tillage unit further comprises a channel member supported on a top side of the trailing arm at an intermediate location along the trailing arm which receives a bottom end of the biasing member therein so as to be arranged to anchor the bottom end of the biasing member relative to the trailing arm.

17. The implement according to claim 11 wherein the stop member comprises a threaded fastener coupled between the side plates.

18. The implement according to claim 17 wherein the biasing member is enclosed by the side plates, a rear plate connected between the side plates rearwardly of the biasing member and the trailing arm therebelow such that the biasing member is only removable from the tillage unit by removing said threaded fastener and pivoting the trailing arm downwardly beyond the working position.

19. The implement according to claim 11 wherein each tillage unit further comprises a slider member mounted on each side of the trailing arm in sliding engagement with the respective side plate, the slider members being formed of a plastic material which is more slidable than the trailing arm.

20. A tillage implement comprising:
- a main frame arranged for connection to a towing vehicle so as to be supported for movement across the ground in a forward working direction;
- a plurality of toolbar sections supported on the main frame so as to be oriented to extend in a lateral direction transversely to the forward working direction;
- a plurality of tillage units supported on the toolbar sections respectively, each tillage unit comprising:
  - a mounting member mounted on the respective toolbar section;
  - a pair of side plates supported parallel to one another and spaced apart from one another in the lateral direction of the respective toolbar section on the mounting member, and oriented in the forward working direction;
  - a trailing arm extending generally rearwardly from a forward end pivotally coupled between the pair of side plates to an opposing trailing end such that the trailing end is movable upwardly from a normal working position to a deflected position;
  - at least one coulter disk supported on the trailing end of the trailing arm so as to be arranged for tilling the ground; and
  - a biasing member comprising a linear acting spring received laterally between the two side plates and extending between opposing first and second ends in which the first end is fixedly anchored relative to the side plates and the second end is fixedly anchored relative to the trailing arm so as to be arranged to bias the trailing arm downwardly towards the normal working position; and
  - wherein a rear edge of each side plate is in a rearward trailing relationship with the biasing member along a full height of the biasing member so as to fully enclose the biasing member at both laterally opposing sides thereof.

21. The tillage implement according to claim 20 wherein the first end of the spring is received within a first pocket fixed relative to the side plates and wherein the second end of the spring is received within a second pocket fixed relative to the trailing arm.

* * * * *